United States Patent [19]
Hashimoto

[11] Patent Number: 5,018,092
[45] Date of Patent: May 21, 1991

[54] STACK-TYPE ARITHMETIC CIRCUIT

[75] Inventor: Kuniharu Hashimoto, Tokyo, Japan

[73] Assignee: NEC Corporation, Tokyo, Japan

[21] Appl. No.: 421,983

[22] Filed: Oct. 16, 1989

[30] Foreign Application Priority Data
Oct. 18, 1988 [JP] Japan .................... 63-260611

[51] Int. Cl.⁵ ............................................ G06F 7/38
[52] U.S. Cl. .................................................. 364/736
[58] Field of Search ........................................ 364/736

[56] References Cited
U.S. PATENT DOCUMENTS
3,564,226  2/1971  Seligman ............................ 364/736
3,596,073  7/1971  Yokoyama et al. ................. 364/736
4,587,632  5/1986  Ditzel ................................. 364/736
4,799,181  1/1989  Tague et al. ........................ 364/736

OTHER PUBLICATIONS
McGraw Hill: Computer Science Series, 1971, Computer Structures: Readings and Examples, pp. 267–273.

Primary Examiner—David H. Malzahn
Attorney, Agent, or Firm—Foley & Lardner

[57] ABSTRACT

A stack-type arithmetic circuit includes a first register, a second register, and a stack. The first register has input and output terminals connected to an external bus via buffers, respectively, and holds the latest value pushed by the arithmetic circuit. The second register has input and output terminals connected to the output and input terminals of the first register, respectively, and holds an immediately preceding value of the latest value. The stack holds remaining data to be operated. Outputs from the first and second registers are supplied to an arithmetic unit, and an output result from the arithmetic unit is returned to the first register.

4 Claims, 2 Drawing Sheets

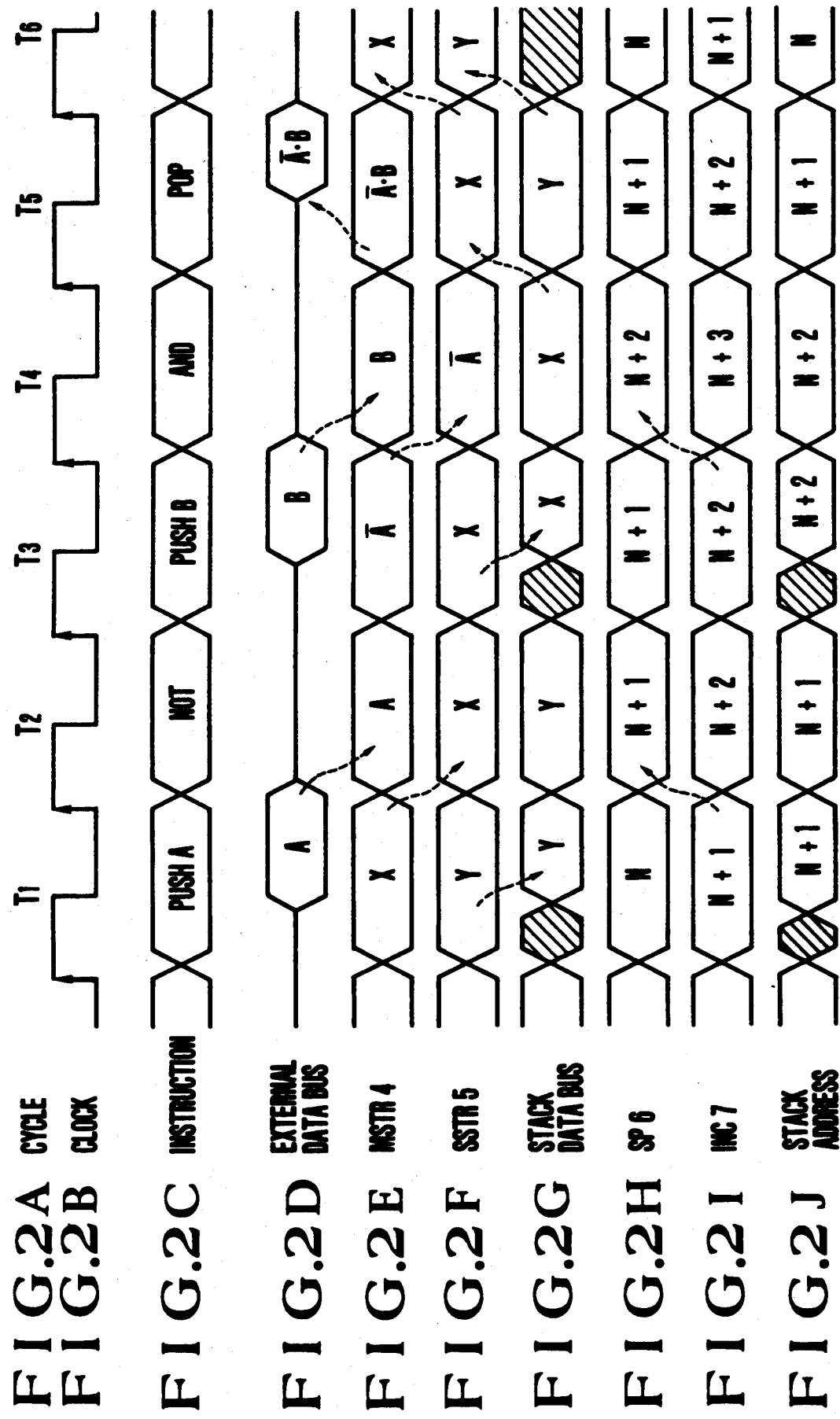

STACK-TYPE ARITHMETIC CIRCUIT

BACKGROUND OF THE INVENTION

The present invention relates to an arithmetic circuit for performing arithmetic, logical, and other general operations and, more particularly, to a stack-type arithmetic circuit for performing operations by using a stack.

A conventional stack-type arithmetic circuit of this type pops necessary data from a stack to perform an operation, and pushes back an operation result to the stack. That is, data to be operated is stored in only the stack. An up/down counter is used as a stack pointer for accessing the stack.

The operation speed of the above conventional stack-type arithmetic circuit, however, is lower than that of an arithmetic circuit (to be referred to as a register-type arithmetic circuit hereinafter) which holds data to be operated in a register and stores an operation result in the register In addition, this register-type arithmetic circuit can execute an instruction in one cycle, while the stack-type arithmetic circuit cannot execute an instruction in one cycle since the stack must be accessed Furthermore, since the structure of an up/down pointer used as a stack pointer is complicated, switching between counting directions requires a long time.

SUMMARY OF THE INVENTION

It is a first object of the present invention to provide a stack-type arithmetic circuit capable of increasing an operation speed above that of a conventional arithmetic circuit.

It is a second object of the present invention to provide a stack-type arithmetic circuit capable of completing an operation in one cycle of a stack.

It is a third object of the present invention to provide a stack-type arithmetic circuit capable of forcibly interrupting all instructions currently being executed in accordance with an external signal.

In order to achieve the above objects of the present invention, there is provided a stack-type arithmetic circuit which has a stack structure for holding data to be operated, performs an operation by an arithmetic unit by using the data to be operated on the stack in accordance with an operation instruction, and stores an operation result again in the stack, comprising a first register, having input and output terminals connected to an external bus via buffers, respectively, for holding the latest value pushed by the stack, a second register, having input and output terminals connected to the output and input terminals of the first register, respectively, for holding an immediately preceding value of the latest value, and a memory for holding remaining data in the stack be operated, wherein outputs from the first and second registers are supplied to the arithmetic unit, and an output result from the arithmetic unit is returned to the first register.

BRIEF DESCRIPTION OF THE DRAWINGS

FIGS. 2A to 2J are timing charts showing an operation of the circuit shown in FIG. 1.

DETAILED DESCRIPTION OF THE PREFERRED EMBODIMENT

Figure 1:
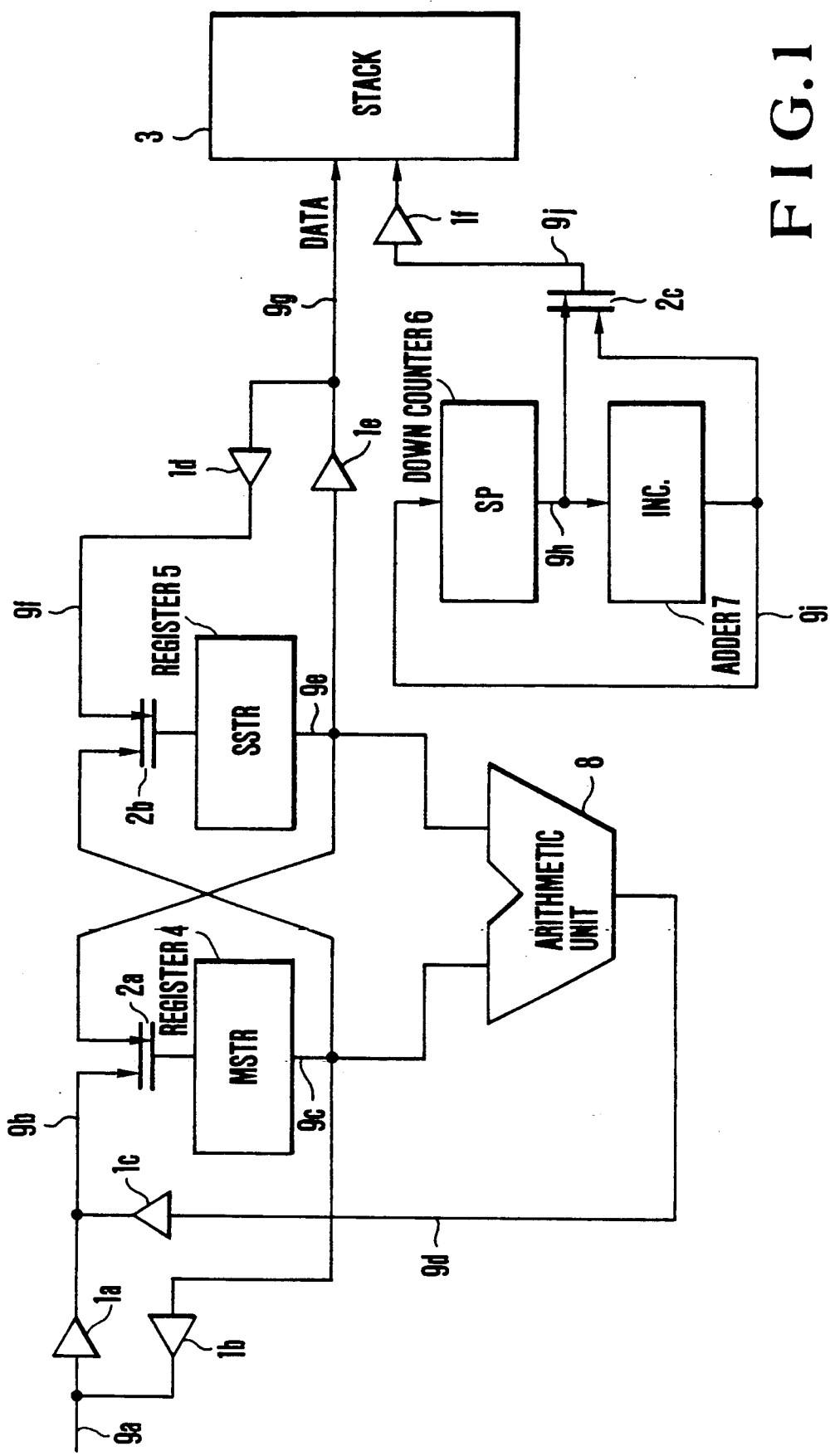
FIG. 1 is a block diagram showing an embodiment of the present invention.

An embodiment of the present invention will be described in detail below with reference to the accompanying drawings.

FIG. 1 shows an arithmetic circuit according to the embodiment of the present invention. Referring to FIG. 1, reference numerals 1a to 1f denote buffers; 2a to 2c, 2-input/1-output data selectors; 3, a memory (STACK); 4, a register (MSTR) for holding the most significant data of a logical stack; 5, a register (SSTR) for holding the second significant data of the logical stack; 6, a down counter (SP) which receives an output from an adder (to be described below) as a new down counter value and is updated at the leading edge of a clock at the end of each of execution cycles T1, T2, ..., shown in FIG. 2A; 7, an adder (INC) for adding "1" to an output value from the down counter (SP); 8, an arithmetic unit for actually performing an operation; and 9a to 9j, signal lines.

The register (MSTR) 4 and the register (SSTR) 5 are updated to input values at the leading edge of a clock shown in FIG. 2B at the end of each of execution cycles T1, T2, T3, ..., shown in FIG. 2A. The memory (STACK) 3 is similarly updated to a value of an address represented by an address from the buffer 1f. FIGS. 2A to 2J are timing charts showing an operation of the arithmetic circuit, in which FIG. 2C shows an operation instruction to be executed; FIG. 2D, data on the signal line 9a; FIG. 2e, data in the register (MSTR) 4; FIG. 2f, data in the register (SSTR) 5; FIG. 2g, data on the signal line 9g; FIG. 2H, data in the down counter (SP) 6; FIG. 21, an output from the adder (INC) 7; and FIG. 2J, data on the signal line 9j.

An operation of the arithmetic circuit having the above arrangement will be described below with reference to FIGS. 2A to 2J. In order to externally push data to the logical stack, external data is inputted to the register (MSTR) 4 via signal line 9a - buffer 1- signal line 9b - selector 2a. Data in the register (MSTR) 4 is inputted to the register (SSTR) 5 via signal line 9c - selector 2b. Data in the register (SSTR) 5 is inputted to the memory (STACK) 3 via signal line 9e - buffer 1e - signal line 9g. At this time, the value of the down counter (SP) 6 is incremented by "1" by the adder (INC) 7 and this result is supplied from the selector 2c to the memory (STACK) 3 as its address via the buffer 1f. Even if interruption of a PUSH instruction is externally forced while the instruction is being executed, the instruction can be interrupted if it is before the leading edge of a clock. In this case, even if the value of the memory (STACK) 3 is already updated, data in the memory (STACK) 3 can be held unless the down counter (SP) 6 is updated. In order to pop data from the stack 3 to external equipment, the most significant data of the logical stack is outputted to external equipment via register (MSTR) 4- signal line 9c - buffer 1b - signal line 9a. The second significant data in the logical (STACK) 3 is selected via register (SSTR) 5- signal line 9e - data selector 2a and input to the register (MSTR) 4. Data to be input to the register (SSTR) 5 is selected via memory (STACK) 3- signal line 9g - buffer 1d - data selector 2b and input to the register (SSTR) 5. At this time, the value of the down counter (SP) 6 is selected by the selector 2c and inputted from the buffer 1f to the stack 3 as its address. The register (MSTR) 4 and register (SSTR) 5 are updated and the value of the down counter (SP) 6 is decremented at the leading edge of a clock at the end of each of the execution cycles T1, T2, ... In this case, if interruption of the instruction is externally forced, the instruction can be interrupted by interrupting updating of the register (MSTR) 4, the register (SSTR) 5, and the down counter (SP) 6. In order to perform a binary operation using the most significant data and the second significant data of the stack 3 as data to be operated, data to be operated is input from the register (MSTR) 4 to the arithmetic unit 8 via the signal line 9c and is also input from the register (SSTR) 5 to the arithmetic unit 8 via the signal line 9e, and the arithmetic unit 8 executes the operation. The operation result is input to the register (MSTR) 4 via signal line 9d - buffer 1c - selector 2a. Data to be set in the register (SSTR) 5 is supplied from the memory (STACK) 3 as in the pop operation. At this time, the value of the down counter (SP) 6 is similarly supplied to the memory (STACK) 3 as its address. The register (MSTR) 4 and the register (SSTR) 5 are updated and the value of the down counter (SP) 6 is decremented at the leading edge of the clock at the end of each execution cycle. As in the case of the pop operation, the operation instruction can be interrupted by interrupting updating of the register (MSTR) 4, the register (SSTR) 5, and the down counter (SP) 6. In order to perform a unitary operation using the most significant data of the logical stack as data to be operated, data to be operated is supplied to the arithmetic unit 8 via register (MSTR) 4- signal line 9c, and the arithmetic unit 8 executes the operation. The operation result is input to the register (MSTR) 4 via signal line 9d - buffer 1c - data selector 2a. The register (MSTR) 4 is updated at the leading edge of the clock (see FIG. 2B) at the end of each execution cycle shown in FIG. 2A. In this case, the operation instruction can be interrupted by interrupting updating of the register (MSTR) 4.

A calculation of equation C=NOT (A) AND (B) will be described below as an example. In an operation instruction shown in FIG. 2C, if a PUSH instruction is executed in the execution cycle T1, data "A" on the signal line 9a connected to an external data bus shown in FIG. 2D is read by the register (MSTR) 4 via buffer 1a - signal line 9b - data selector 2a, as shown in FIG. 2E. At this time, a value X of the register (MSTR) 4 is transferred to the register (SSTR) 5 via signal line 9c - data selector 2b, as shown in FIG. 2F. The value of the adder (INC) 7 is set in the down counter (SP) 6, as shown in FIG. 2H. When a NOT instruction shown in FIG. 2C is executed in the execution cycle T2, negation "$\overline{A}$" of the data "A" is set in the register (MSTR) 4, while the other values are kept unchanged. When a PUSH instruction shown in FIG. 2C is executed in the execution cycle T3, data B on the signal line 9a shown in FIG. 2D is read by the register (MSTR) 4 via buffer 1a - signal line 9b - data selector 2a, as shown in FIG. 2E. The other operation is the same as in the execution cycle T1. When an AND instruction shown in FIG. 2C is executed in the execution cycle T4, an AND result of NOT (A) AND (B) is set in the register (MSTR) 4, and the previous data X is returned from the memory (STACK) 3 to the register (SSTR) 5. For this reason, the value of the down counter (SP) 6 is decremented as shown in FIG. 2H. When a POP instruction shown in FIG. 2C is executed in the execution cycle T5, the operation result in the register (MSTR) 4 is output to the external data bus via signal line 9c - buffer 1b - signal line 9a, as shown in FIG. 2D. The value X is returned from the register (SSTR) 5 to the register (MSTR) 4, and the value Y is returned from the memory (STACK) 3 to the register (SSTR) 5. The value of the down counter (SP) 6 is decremented.

As has been described in detail above, according to the arithmetic circuit of the present invention, the register for holding data to be operated is additionally used together with the stack pointer and the adder, thereby simultaneously executing access of the stack and an operation. In addition, since an operation can be completed in one cycle of a clock, an operation speed can be increased. Furthermore, since updating of the registers and the counter is performed at the end of each execution cycle, all instructions currently being executed can be forcibly interrupted by an external signal.

What is claimed is:

1. A stack-type arithmetic circuit which has a stack structure for holding data to be operated, and which performs an operation by an arithmetic unit using the data to be operated on, comprising:
  a first register having input and output terminals;
  an external bus connected to the terminals of said first register;
  buffers connected between said terminals and said bus for holding the latest value pushed by said arithmetic circuit;
  a second register, having input and output terminals connected to the output and input terminals of said first register, respectively, for holding an immediately preceding value of the latest value;
  wherein the outputs from said first and second registers are supplied to said arithmetic unit, and an output result from said arithmetic unit is returned to said first register;
  a stack for holding remaining data to be operated; and
  a stack pointer to access said stack, the stack pointer having a down counter and an adder, the adder adding one digit to the output of the down counter, wherein the output from said adder is used as the write address to said stack and the value in said down counter is updated by the output of said adder when a PUSH instruction is executed to said stack, and the output from said down counter is used as the read out address to said stack and the value in said down counter is decremented when a POP instruction is executed to said stack.

2. A circuit according to claim 1, wherein the output terminal of said second register is connected to and supplies data to said stack.

3. A circuit according to claim 2, wherein the output from said first register and the data from said stack and selectively supplied to the input terminal of said second register.

4. A circuit according to claim 1, wherein said first and second registers are updated at a leading edge of a clock pulse at the end of an execution cycle.

* * * * *